United States Patent Office 3,496,161
Patented Feb. 17, 1970

3,496,161
REACTIVE AZO, PERINONE AND NAPHTHOYL-ENE-BENZIMIDAZOLE DYES CONTAINING 2-CHLOROBENZOTHIAZOLE GROUPS
Aimé Joseph Arsac, Condrieu, and Fidele Domenech, Saint-Clair-du-Rhone, France, assignors to Etablissements Kuhlmann, Paris, France
No Drawing. Continuation-in-part of application Ser. No. 161,419, Dec. 22, 1961. This application Apr. 28, 1965, Ser. No. 451,657
Claims priority, application France, Dec. 26, 1961, 847,989; Aug. 10, 1961, 870,532; Apr. 30, 1964, 973,077
Int. Cl. C09b 62/36, 62/40
U.S. Cl. 260—158                                       3 Claims

ABSTRACT OF THE DISCLOSURE

Provided are fiber reactive dyestuffs of the formula

B—N=N—[2-chlorobenzothiazole structure with X]

in which X represents a member selected from the group consisting of hydrogen and a sulfonic acid group and B represents the residue of a coupling compound selected from the group consisting of the benzene, naphthalene, pyrazolone or acetylacetarylide series. Also provided are fiber reactive dyestuffs of the formula D—Z—[2-chlorobenzothiazole structure with X]

in which D represents the radical of a dyestuff selected from the group consisting of perinone or naphthoylene-benzimidazole series, X represents a member selected from the group consisting of hydrogen and a sulphonic group, Z represent a member selected from the group consisting of —COHN—A—NHSO$_2$S— · —SO$_2$NH—, —SO$_2$HN—A—NHO$_2$S —COHN—A—NHOC, and —SO$_2$HN—A—NHOC—, and A is the radical of the diamine. These fiber reactive dyes are useful in dyeing fibers containing hydroxy or imino groups with excellent fastness to wet treatment.

---

This application is a continuation-in-part of applicants' parent application Ser. No. 161,419 filed Dec. 22, 1961 and now abandoned.

The present invention concerns new dyestuffs.

It is known that so-called reactive dyestuffs unite chemically with the fibre during the dyeing and that the shades obtained have, for this reason, excellent fastness to wet treatments. The dyestuffs of this type which have attained most importance contain the following groups of atoms:

$$-\overset{N}{\underset{N}{\overset{\parallel}{C}}}\overset{}{\underset{\underset{C}{|}}{\overset{}{C}}}-Cl \quad \text{or} \quad \overset{}{\underset{N}{\overset{C}{\overset{}{C}}}}\overset{}{\underset{\underset{C}{|}}{\overset{}{C}}}-Cl$$

or —SO$_2$—CH$_2$—CH$_2$—OSO$_3$H.

These dyestuffs unite chemically with cellulosic fibres by the elimination of hydrochloric or sulphuric acid at the expense of the chlorine atoms or the above indicated sulphuric ester group and the OH groups of the cellulose. In the case of polypeptide fibres, it is supposed that the chlorine atoms or the sulphuric ester groups react with the hydrogen atoms of the NH$_2$— or —NH— groups of the fibre. These condensation reactions with elimination of acid generally take place in the hot at between 60° C. and 160° C. and in the presence of alkaline agents.

According to the present invention new fibre-reactive dyestuffs are provided which contain in their molecule a 2-chlorobenzothiazole radical or a 2-chloro-sulphobenzothiazole radical.

The invention includes within its scope fibre-reactive dyestuffs of the general formula:

B—N=N—[structure] C—Cl     (I)

in which X represents a hydrogen atom or a sulphonic acid group and B represents the residue of a coupling compound of the benzene, naphthalene, pyrazolone or acetylacetarylide series.

It also includes dyestuffs of the general formula:

D—Z—[structure] C—Cl     (II)

in which D represents the radical of a dyestuff of the perinone or naphthoylenebenzimidazole series, X represents a hydrogen atom or a sulphonic acid group, Z represents a —COHN—A—NHSO$_2$S—, —SO$_2$NH—, —SO$_2$HN—A—NHO$_2$S— —COHN—A—NHOC— or —SO$_2$HN—A—NHOC— linkage, and A is the radical of the diamine.

The dyestuffs of the invention are capable of becoming fixed, by chemical reaction, on textile fibres containing hydroxy or imino groups. This chemical reaction is due to the chlorine atom which is capable of bringing about condensation between the dyestuff and the fibres containing hydroxy or imino groups.

With a view to the preparation of the dyestuffs of this invention the appropriate amines may be subjected to various standard reactions of the dyestuff industry, which, however, are chosen so that the chlorine atom is not split off while they are being carried out. The following may be mentioned as examples of these reactions: diazotisation and coupling with the usual coupling compounds which may themselves be dyestuffs (bridge: —N=N—); condensation with carboxylic or sulphonic acid halides containing chromophore groups, such as phthalocyanine sulphochlorides, substituted anthraquinonecarboxylic acid chlorides, sulphochlorides and carboxychlorides of the perinones and of naphthoylenebenzimidazoles (bridges: —NH—O$_2$S— and —NH—OC—), condensation with carboxylic acid halides containing a phenolic OH group capable of bringing about coupling with diazo derivatives and subsequent coupling with the latter (bridge:

—NHOC—R—N=N—
              |
              OH

R being the radical of the coupling compound); condensation with phosgene in the proportion of one mole of phosgene per —NH$_2$ group and subsequent condensation of the product thus obtained with a dyestuff containing an —NH₂ group (bridge: —NH—OC—HN—) or with a colourless compound containing an NH₂ group and a phenolic OH group capable of bringing about coupling with diazo derivatives and in this last case subsequent coupling with these (bridge:

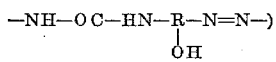

condensation with diketene so as to form an acetoacetyl derivative and subsequent coupling with a diazo derivative (bridge:

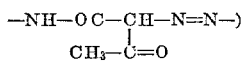

or condensation with aldehydes so as to form azomethine dyestuffs (bridge:

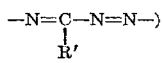

Other reactions may also be used such as, for example, condensation of a carboxylic or sulphonic acid halide containing a chromophore grouping with excess of an aliphatic or aromatic diamine and condensation of the amino compounds obtained with sulphochlorides or carboxychlorides of the formulae:

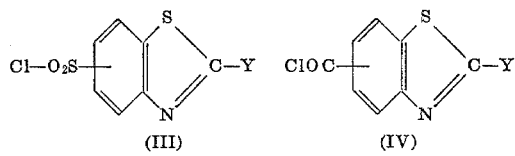

in which Y represent a a halogen atom (bridges:

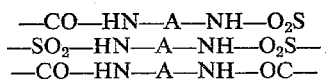

—SO₂—HN—A—NH—OC—, A being the diamine radical); condensation of the chromophore halide with N-mono-acetyldiamine followed by a deacetylation of the product obtained and condensation of this amine with a sulphochloride or carboxychloride of the Formulae III or IV; or condensation of the diamine first with the sulphochloride or carboxychloride of Formulae III and IV, then with the chromophore halide.

The present invention also includes a process for the colouration of textile fibres containing in their chemical structure a hydroxy or imino group, which comprises applying thereto a dyestuff containing in its molecule a 2-chlorobenzothiazole radical or a 2-chloro-sulphobenzothiazole radical and if desired submitting the fibres to a heat treatment.

The heat treatment is preferably effected in the presence fo an acid-absorbing agent and the fibres may be impregnated with solutions or suspensions of the dyestuffs.

The impregnation of the fibres by means of the dyestuffs may be effected by dyeing, foularding or printing. The heat treatment which may take place during or after the impregnation is preferably effected at a temperature between 60 C. and 170° C. and may consist, for example, of raising the temperature of the dyebath, immersion in a hot bath, steaming, or exposure to dry heat. The acid-absorbing agent may be for example, a caustic alkali, alkali metal carbonate, alkali metal bicarbonate, disodium phosphate, trisodium phosphate, ammonia or hexamethylenetetramine.

The process may be applied to the most diverse fibres containing —OH or —NH groups such as for example natural or regenerated cellulosic fibres, partly saponified cellulose acetate fibres, polyvinyl alcohol fibres, wool, silk, leather or superpolyamides. These fibres may be in various forms such as for example flocks, yarn, hanks, spools, cloths, knitted goods, or sheets.

The shades obtained display excellent fastness to wet treatments and the existence of chemical bonds between the dyestuff and the fibre may be shown by extraction by means of dimethyl formamide.

In the following examples which are purely illustrative the parts are by weight unless the contrary is indicated.

EXAMPLE 1

18.4 parts of 6-amino-2-chloro-benzothiazole are mixed with stirring with 150 parts of water and 25 parts by volume of 30% by weight hydrochloric acid. The mixture is heated to 60° C. to homogenise it and then cooled to 5° C. by the addition of ice before adding 6.9 parts of sodium nitrite in solution in 50 parts of water. The stirring is maintained for an hour at a temperature between 5° C. and 10° C. The suspension of diazonium chloride thus obtained is poured, in a period of 15 minutes, into asolution at 10° C. of 25.4 parts of 1-phenyl-3-methyl-5-pyrazolone-4'-sulphonic acid in 100 parts of water in the presence of 10 parts by volume of a 30% by weight solution of caustic soda and 40 parts of crystalline sodium acetate. After coupling has occurred, the dyestuff is precipitated by salting out at 60° C. filtered off and dried at 60° C. until its weight is constant. The dyestuff obtained is an orange-yellow powder, dissolving in water with a bright yellow colour.

The dyestuff dyes cotton a bright yellow and the colour is very fast to wet tests.

(a) Process with two baths: The fabric is first foularded at 60° C. in a bath containing 10 g. per litre of dyestuff and 5 g. per litre of sodium benzylsulphanilate, any other wetting agent, then in the cold in a bath provided with 30 g. per litre of 30% by weight caustic soda and 200 g. per litre of sodium chloride. The fixing of the dyestuff on the fibre is ensured by drying in hot air at between 100° C. and 150° C. The dyed fabric is then treated with a soap solution containing 3 g. per litre for 10 minutes at 90° C.

(b) Process with one bath: The fabric is foularded in a bath containing 10 g. per litre of dyestuff, 20 g. per litre of anhydrous sodium carbonate, 150 g. per litre of urea and, if desired 1 g. to 10 g. per litre of an anionic wetting agent. Fixation of the dyestuff is then ensured by drying with hot air at a temperature over 100° C. followed as above by a washing with soap at 90° C.

For printing on cotton fabric, the following process gives good results with full-bodied, even, bright shades having excellent fastness to washing. A printing paste is prepared by mixing 30 parts of dyestuff, 260 parts of water, 30 parts of 30% by weight caustic soda, 200 parts of urea and 480 parts of a thickener. After printing, fixation is ensured either by steaming at 100–105° C. or by rapid drying at 130–150° C.

On leather, silk, paper, secondary cellulose acetate or polyamide fibres, the shades obtained are also yellow, which are distinguished by their brightness and display good fastness to washing.

On wool, yellow shades which are fast to wet tests, are obtained by dyeing in the presence of 4–8% of 10% by volume acetic acid, first at 50° C. and then for 15 minutes at between 50° C. and 100° C., and finally for one one hour at 100° C. The dyeing is finished at pH 7.5–8.0 by the addition of ammonia and the material is then left for 15 minutes without heating.

EXAMPLE 2

On replacing the coupling compound mentioned in Example 1 by 18.7 parts of 2,4-diamino-benzene-sulphonic acid, a light grey powder, soluble in water which it colours an orange shade is obtained.

This dyestuff dyes cotton an orange shade which is very fast to wet tests. On leathers resulting from various tannings, wool, silk, "Nylon" or "Rilsan," the shades obtained are orange yellow having good fastness to washing.

EXAMPLE 3

The dyestuff obtained by coupling, in the presence of 40 parts of sodium acetate, 32.6 parts of the monosodium salt of 2-hydroxy-naphthalene-3,6-disulphonic acid with the diazonium salt prepared from 18.4 parts of 6-amino-2-chloro-benzothiazole is a bluish red powder, soluble in water with a rose colour.

On cotton fabric it gives on dyeing or printing a rose shade which is bright, even and has an excellent fastness to washing.

The colourations obtained on wool, silk, "nylon," "Rilsan" or leathers resulting from various tannings are also rose with good fastness to washing.

EXAMPLE 4

The dyestuff obtained by coupling, at about pH 3, 32 parts of the diazo derivative of 1-amino-8-hydroxy-naphthalene-3,6-disulphonic acid with 11 parts of resorcinol is reacted in an acetic acid-sodium acetate medium with the diazonium salt prepared from 18.4 parts of 6-amino-2-chlorobenzothiazole.

The diazo dyestuff so obtained is a yellowish brown powder, soluble in water which it colours a reddish brown shade. On dyeing and printing it colours cotton a yellowish brown, which is very fast to wet tests. On leathers resulting from various tannings, the shades are yellowish brown of beautiful appearance; on wool, silk or "nylon," the shades are reddish brown having good fastness to washing.

EXAMPLE 5

111 parts of 2-chloro-6-amino-benzothiazole are introduced at 20° C. into 360 parts of 100% sulphuric acid. The temperature rises rapidly and reaches 90° C. at the end of the addition. 640 parts of oleum containing 20% of sulphur trioxide are then introduced in a period of an hour, and the temperature is then increased in half an hour to 120° C. and maintained at this value for a further hour. After cooling to 30° C., the mass is poured on to 1200 parts of crushed ice, 100 parts of sodium chloride are added and it is left to cool, with stirring, to ordinary room temperature. After filtering, washing with a saturated aqueous solution of sodium chloride until congo red paper changes colour in the washings, and drying, about 140 parts of an aminosulphonic acid of molecular weight 264.5 are obtained.

26.5 parts of this acid are dissolved in 400 parts of water, while the pH is adjusted to 6-7 by the addition of a dilute aqueous solution of sodium hydroxide, and the mixture is then cooled to 0° C. by the addition of crushed ice. 25 parts of a 30% aqueous solution of hydrochloric acid and 6.9 parts of sodium nitrite in solution in 14 parts of water are added, and the mixture is stirred at between 0° C. and 5° C. until diazotisation is complete. This suspension is then introduced at 5–10° C. into an aqueous solution of 32.5 parts of 1-(2',5'-dichloro)-phenyl-3-methyl-5-pyrazolene-4'-sulphonic acid in 300 parts of water and 24 parts of anhydrous sodium carbonate. When the condensation is finished, the dyestuff is precipitated by the addition of 10 parts of a 30% aqueous solution of hydrochloric acid and 200 parts of sodium chloride. After filtering, draining and drying, an orange-brown powder, very soluble in water, is obtained which on cotton, according to the methods of operation of the preceding examples, gives golden yellow dyeings and prints which are very fast to light and to the wet tests. The reactive nature of the dyestuff is shown by agitating a dyed sample with boiling dimethyl formamide, which remains uncoloured.

If the 1-(2',5'-dichloro)-phenyl-3-methyl-5-pyrazolone-4'-sulphonic acid in this example is replaced by an equimolecular amount of any of the following coupling compounds, dyestuffs are obtained which give shades on cotton that are fast to wet tests.

| Coupling component | Shade |
|---|---|
| 1-(2'-chloro)-phenyl-3-methyl-5-pyrazolone-4'-sulphonic acid | Golden yellow. |
| Acetylacetaniline | Greenish yellow. |
| Phenol | Yellowish orange. |
| 1-phenyl-3-methyl-5-pyrazolone-4'-sulphonic acid | Reddish yellow. |
| 1-phenyl-5-pyrazolone-3-carboxyl-4'-sulphonic acid | Yellowish orange. |
| 2-hydroxy-naphthalene-6,8-disulphonic acid | Do. |
| 1-hydroxy-8-p-toluenesulphonylamino-naphthalene-3,6-disulphonic acid | Bluish red. |
| 1-hydroxy-8-benzoylamino-naphthalene-3,6-disulphonic acid | Violet red. |
| 1-hydroxy-naphthalene-3,8-disulphonic acid | Red. |
| 1,8-dihydroxy-naphthalene-3,6-disulphonic acid | Bluish red. |
| 1-hydroxy-naphthalene-4-sulphonic acid | Yellowish red. |
| 1-hydroxy-8-benzoylamino-naphthalene-3,5-disulphonic acid | Bluish red. |
| 2-hydroxy-naphthalene-3,6-disulfonic acid | Red. |
| 1-hydroxy-6-amino-naphthalene-3-sulphonic acid | Orange. |
| 1-hydroxy-5-amino-naphthalene | Reddish violet. |
| 1-hydroxy-6-p-tolylamino-naphthalene-3-sulphonic acid | Orange. |
| 1-hydroxy-6-benzoylamino-naphthalene-3-sulphonic acid | Do. |
| 1-hydroxy-naphthalene | Yellowish red. |
| 2-hydroxy-naphthalene | Orange. |
| 1-hydroxy-8-amino-naphthalene-5,7-disulphonic acid | Violet. |
| 1-hydroxy-8-amino-naphthalene-4-sulphonic acid | Do. |
| 1-p-tolylamino-naphthalene-8-sulphonic acid | Bordeaux. |
| 1-hydroxy-naphthalene-3,6-disulphonic acid | Red. |
| 1-ethylamino-naphthalene | Scarlet. |
| 1-amino-naphthalene-8-sulphonic acid | Do. |
| 2-hydroxy-naphthalene-8-sulphonic acid | Reddish orange. |
| N-dihydroxyethylaniline | Yellowish orange. |
| Phenol-2,6-disulphonic acid | Reddish orange. |
| Acetylacetyl-o-chloroaniline | Yellow. |

EXAMPLE 6

26.5 parts of 2-chloro-6-amino-benzothiazole-sulphonic acid are dissolved in 400 parts of water while the pH is brought to 6.7 by the addition of a dilute aqueous solution of sodium hydroxide. The solution is cooled to 0° C. by the addition of crushed ice. 25 parts of a 30% aqueous solution of hydrochloric acid and 6.9 parts of sodium nitrite in solution in 14 parts of water are added and the mixture is stirred at between 0° C. and 5° C. until the diazotisation is complete. This suspension is then introduced into an aqueous solution at a temperature of 5° C. to 10° C. of 33.4 parts of 1-phenyl-3-methyl-5-pyrazolone-2'4'-disulphonic acid in 30 parts of water and 24 parts of anhydrous sodium carbonate. When the coupling is finished, the dyestuff is precipitated by the addition of 10 parts of a 30% aqueous solution of hydrochloric acid and 250 parts of sodium chloride. The dyestuffs obtained is filtered off, drained and dried. It is a brown yellow powder; it gives golden yellow dyeings and prints on cotton which are very fast to light and to the wet tests. The reactive nature of the dyestuffs is demonstrated by the fact that a sample of dyed fabric, placed in boiling dimethylformamide, leaves the latter colourless.

The following table gives examples of reactive monoazo dyestuffs prepared in an analogous way from 2-chloro-6-amino-benzothiazole-sulphonic acid and the coupling compounds given below.

hydrochloric acid. The mixture is stirred for three quarters of an hour at 18° C. to 20° C., and the slight excess of nitrous acid is destroyed by the addition of sulphamic acid. The suspension of the diazo derivative is introduced over a quarter of an hour at 8° C. to 10° C. into a solution of 11 parts of resorcinol in 150 parts of water containing 70 parts of sodium carbonate. After

| Example | Coupling compound | Shade on cotton |
|---|---|---|
| 7 | 1-methyl-4-hydroxybenzene | Yellow. |
| 8 | 1-hydroxy-4-nitrobenzene | Do. |
| 9 | 1-hydroxy-4-chlorobenzene | Do. |
| 10 | 1-hydroxy-4-chloro-naphthalene | Red. |
| 11 | 1-hydroxy-8-acetylamino-napthhalene-3,5-disulphonic acid | Red. |
| 12 | 1-hydroxy-8-acetylamino naphthalene-5-sulphonic acid | Violet red. |
| 13 | 1-hydroxy-8-benzoylamino-naphthalene-5-sulphonic acid | Red violet. |
| 14 | 1-hydroxy-8-acetylamino-naphthalene-5,7-disulphonic acid | Violet red. |
| 15 | 1-hydroxy-8-benzoylamino-naphthalene-5,7-disulphonic acid | Red violet. |
| 16 | 1-hydroxy-7-acetylamino-napthhalene-3,6-disulphonic acid | Violet. |
| 17 | 1-hydroxynaphthalene-4,7-disulphonic acid | Scarlet. |

EXAMPLE 18

26.5 parts of 2-chloro-6-amino-benzothiazole-sulphonic acid are dissolved in 200 parts of water while the pH is brought to 7.5 by the addition of a dilute aqueous solution of sodium hydroxide. 6.9 parts of sodium nitrite in solution in 14 parts of water are added. The solution thus obtained is introduced into a mixture of 100 parts of water and 42 parts of a 30% solution of hydrochloric acid. The mixture is stirred for three quarters of an hour at 18° C. to 20° C. and the slight excess of nitrous acid is destroyed by the addition of sulphamic acid. Into the above suspension is introduced over a period of a quarter of an hour a solution of 32 parts of 1-hydroxy-8-aminonaphthalene-3,6-disulphonic acid dissolved in 180 parts of water, the pH of which is brought to 6.5 by the addition of an aqueous solution of sodium hydroxide. The mixture is stirred for half an hour while heating at 18° C. to 20° C., then a solution prepared by dissolving 80 parts of crystalline sodium acetate in 110 parts of water is added over a period of 1 hour. At the end of the addition the pH is 4.5. The mixture is stirred for 1 hour, then taken to a temperature of 25° C. and stirred for a further hour.

26.5 parts of 2-chloro-6-amino-benzothiazole-sulphonic acid are subjected to diazotisation as in the preceding paragraph. The suspension of the diazo derivative is introduced into the violet solution of the dyestuff obtained above, which was first treated with 70 parts of sodium carbonate and heated to 18° C. to 20° C. The mixture is raised to 25° C. and stirred for 1 hour. 220 parts of sodium chloride are added, and then a 30% solution of hydrochloric acid unitl a pH of 6 is obtained. After stirring for some hours, the product is filtered off and dried. 80 parts of a black powder are obtained which gives on cotton or viscouse deep black dyeings and prints which are particularly fast to light and to wet tests.

EXAMPLE 19

On replacing the 1-hydroxy-8-amino-naphthalene-3,6-disulphonic acid of Example 18 by 1-hydroxy-8-amino-naphthalene-3,5-disulphonic acid, a more bluish black shade is obtained which has similar properties.

EXAMPLE 20

26.4 parts of 2-chloro-6-amino-benzothiazole-sulphonic acid are dissolved in 200 patrs of water while bringing the pH to 7.5 by the addition of an aqueous solution of sodium hydroxide. 6.9 parts of sodium nitrite in solution in 14 parts of water are added, and the solution thus obtained is introduced into a mixture of 100 parts of water and 42 parts of a 30% solution of hydrochloric acid. The mixture is stirred for three quarters of an hour at 18° C. to 20° C., and the slight excess of nitrous acid is destroyed by the addition of sulphamic acid. The suspension of the diazo derivative is introduced over a quarter of an hour at 8° C. to 10° C. into a solution of 11 parts of resorcinol in 150 parts of water containing 70 parts of sodium carbonate. After the addition, the pH is 8.7. The mixture is stirred for 1 hour at 8° C. to 10° C., then for 12 hours at 18° C. to 20° C.

26.9 parts of 1-hydroxy-2-aminobenzene-4,6-disulphonic acid are dissolved in 250 parts of ice water. The pH is brought to 7.5 by the addition of a solution of sodium hydroxide. Then 14.4 parts of a 30% aqueous solution of hydrochloric acid are added so that the pH falls to 2.8. Then 7 parts of sodium nitrite dissolved in 14 parts of water are added at between 0° C. and 50° C. over a period of 20 minutes, and stirring is carried out for a further hour. The solution of the diazo derivative thus prepared is added to the solution of the dyestuff prepared according to the preceding paragraph to which has been added 39 parts of a 33% aqueous solution of sodium hydroxide. Coupling takes place at 8° C. to 10° C., and the reaction mixture is kept for 1 hour at 8° C. to 10 C. and for 12 hours at 18° C. to 20° C. Then a 30% aqueous solution of hydrochloric acid is added until a pH of 3.5 is obtained. 150 parts of sodium chloride are added and after leaving to stand for several hours, the mixture is filtered.

The dyestuff paste obtained according to the previous paragraph is diluted in 150 parts of water. 6 parts of sodium carbonate in order to bring the pH to 6.5, and 19 parts of a 22% aqueous solution of ammonia are added. 22 parts of crystalline copper sulphate dissolved in 50 parts of water are slowly introduced. The mixture is heated for 2 hours at 60° C., then left to stand for 12 hours and the pH brought to 3.5 by the addition of 7 parts of a 30% solution of hydrochloric acid. 50 parts of sodium chloride are added and after standing for several hours, the dyestuff is filtered off, drained and dried. A deep brown powder is obtained which dyes cotton a brown shade with a remarkable fastness to light and to the wet tests.

EXAMPLE 21

On replacing the copper sulphate in Example 20 above by nickel sulphate, a brown dyestuff of a more yellowish shade than the preceding one is obtained.

EXAMPLE 22

(a) Sulphochlorination of 1,4,5,8-naphthoylenedibenzimidazole (cis derivative)

44 parts of dry powdered 1,4,5,8-naphthoylene dibenzimidazole (cis derivative) are introduced into 180 parts of chlorosulphonic acid and the mixture is heated to 80° C. and kept for 2 hours at this temperature. Then 50 parts of thionyl chloride are added over a period of three quarters of an hour and the mixture is kept for a further hour at 80° C. It is allowed to cool to the ambient temperature and poured on to 700 parts of water and ice. After homogenisation, the solid is fitlered off and drained.

(b) Condensation with 6-amino-2-chloro-benzothiazole

The moist precipitate is taken up in 500 parts of water. 65 parts of a 36° Bé. aqueous solution of sodium hydroxide, then 50 parts of sodium bicarbonate, and finally 21 parts of 6-amino-2-chloro-benzothiazole are added. The pH is about 8. The mixture is stirred at the ambient temperature for about twenty hours, then 50 to 55 parts of 20° Bé hydrochloric acid are added in order to bring the pH back to 7, and 50 parts of sodium chloride are added. After stirring for an hour, the solid is filtered off, drained and dried, about 130 parts of a red brown dyestuff being obtained.

EXAMPLE 23

If the trans derivative of 1,4,5,8-naphthoylenedibenzimidazole is used in Example 22 instead of its cis isomer, the other conditions being the same, about 130 parts of an orange dyestuff are obtained.

EXAMPLE 24

(a) 1,4,5,8-naphthoylene-dibenzimidazole (cis derivative) is sulphochlorinated as in Example 22.

(b) The sulphochloride obtained is condensed as in Example 22, but using 21 parts of monoacetyl-metaphenylenediamine instead of 6-amino-2-chloro-benzothiazole.

(c) The precipitate obtained, merely drained, is taken up in 400 parts of water and 85 parts of 20° Bé. hydrochloric acid, and deacetylated by heating for 2 hours at 70° C. It is left cool, and the precepitate is filtered off and drained.

(d) The precipitate is taken up in 700 parts of water and about 30 parts of a 36° Bé. aqueous solution of sodium hydroxide are added until a pH is 7. The mixture is heated to 60° C. and 12 parts of magnesia are added, when the pH rises to 9. In an hour 30 parts of 2-chloro-benzothiazole-6-sulphochloride are introduced. The mixture is kept for a further hour at 60° C., allowed to cool, and the solid filtered off, drained and dried. 150 parts of an orange brown dyestuff are obtained.

The 2-chloro-benzothiazole-sulphochloride may be prepared as follows: 100 parts by volume of chlorosulphonic acid are introduced into an apparatus provided with a stirrer, then 40 parts of 2-chloro-benzothiazole are slowly added. A white crystalline product is formed which is a complex of 2-chloro-benzothiazole and the chlorosulphonic acid. This is heated at 115° C. to 120° C. until hydrochloric acid is no longer evolved, which may be from 6 to 7 hours, and is then left to cool and poured on to ice. The 2-chloro-benzothiazole sulphochloride thus obtained is in a viscous and sticky form. The aqueous phase is removed by siphoning, then the crude sulphochloride is dissolved with stirring in 200 parts by volume of diethyl ether. The ethereal solution is dehydrated by passing it over anhydrous sodium sulphate, and the solvent is then removed by distillation. 40 parts of a viscous oil are obtained which crystallises giving an oily crystalline magma. The oil with which it is impregnated is removed by draining, then washing with petrol ether and drying. Finally, 20 parts of 2-chloro-benzothiazole-sulphochloride are obtained in the form of a white crystalline product.

EXAMPLE 25

If the transderivative of 1,4,5,8-dinaphthoylenedibenzimidazole is used in Example 24 instead of the cis isomer, about 150 parts of a yellow brown dyestuff are obtained.

EXAMPLE 26

If 30 parts of 6-amino-7-sulpho-2-chloro-benzothiazole are used for condensation (b) in Example 22 instead of 6-amino-2-chloro-benzothiazole, 130 parts of a brownred dyestuff are obtained.

EXAMPLE 27

If 32 parts of naphthaloperinone are used in Example 24 instead of 1,4,5,8-naphthoylene-dibenzimidazole, the other conditions remaining the same, 105 parts of an orange brown dyestuff are obtained.

EXAMPLE 28

If 27 parts of phthaloperinone are used in Example 24 instead of 1,4,5,8-naphthoylene-dibenzimidazole, 95 parts of a brown yellow dyestuff are obtained.

EXAMPLE 29

50 parts of the dyestuff described in Example 22 are dissolved in 1000 parts of water to which have been added 20 parts of a 36° Bé. aqueous solution of sodium hydroxide and 10 parts of urea. A cotton fabric is impregnated with this solution at 25° C. and passed to foularding machine. The rate of expression is about 80%. The fabric is dried, then placed in a closed cabinet heated at 150° C. for 5 minutes. It is rinsed and washed in a bath of sodium carbonate and soap at the boil, in order to eliminate all the dyestuff which is not chemically fixed. The material is dried, when a red brown shade is obtained which is extremely fast to washing and to light.

EXAMPLE 30

30 parts of the dyestuff described in Example 23 are dissolved in 900 parts of water together with 25 parts of a 36° Bé. aqueous solution of sodium hydroxide and 100 parts of common salt. A cotton fabric is impregnated with this solution, then passed to a foularding machine, the rate of expression being about 80%. The fabric is rolled up, surrounded with a sealed casing and left like this for 15 hours. The fabric is then unrolled, rinsed and washed at the boil in a bath of soap and carbonate. An orange shade is obtained which is very fast to washing and to light and has a fixation rate of the same order of magnitude as that in Example 29.

We claim:
1. Fibre-reactive dyestuffs of the formula:

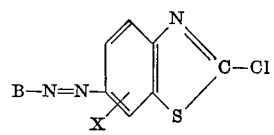

in which X represent a member selected from the group consisting of hydrogen and a sulphonic acid group and B represents the residue of a coupling compound selected from the group consisting of the benzene, naphthalene, pyrazolone and acetylacetarylide series.

2. Fibre-reactive dyestuffs of the formula:

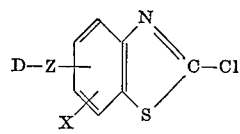

in which D represents the radial of a dyestuff selected from the group consisting of perinones and naphthoylenebenzimidazoles, X represents a member selected from the group consisting of hydrogen and a sulphonic group, Z represents a member selected from the group consisting of —COHN—A—NHO$_2$S—, —SO$_2$NH—, —SO$_2$HN—A—NHO$_2$S, —COHN—A—NHOC— and —SO$_2$HN—A—NHOC— and A is the radiacal of the diamine.

3. An azo dyestuff of the formula:
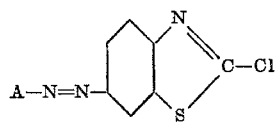
wherein A represents the radical of a coupling compound containing a sulphonic acid group.
References Cited
UNITED STATES PATENTS
3,371,082  2/1968  Mangini et al. _____ 260—158
FOREIGN PATENTS
1,290,839  3/1962  France.
Ad. 80,225  2/1963  France.
FLOYD D. HIGEL, Primary Examiner
U.S. Cl. X.R.
8—41, 50, 71, 72, 63, 12.5, 13; 260—242, 250, 304, 157, 304, 507, 508, 509

UNITED STATES PATENT OFFICE
CERTIFICATE OF CORRECTION

Patent No. 3,496,161                        February 17, 1970

Aime Joseph Arsac et al.

It is certified that error appears in the above identified patent and that said Letters Patent are hereby corrected as shown below:

In the heading to the printed specification, line 11, "Dec. 26, 1961" should read -- Dec. 26, 1960 --.

Signed and sealed this 1st day of December 1970.

(SEAL)
Attest:

Edward M. Fletcher, Jr.
Attesting Officer

WILLIAM E. SCHUYLER, JR.
Commissioner of Patents